(12) United States Patent
Gilbert et al.

(10) Patent No.: US 7,392,217 B2
(45) Date of Patent: Jun. 24, 2008

(54) SYSTEMS AND METHODS FOR CONTROLLING TRADERS FROM MANIPULATING ELECTRONIC TRADING MARKETS

(75) Inventors: Andrew C Gilbert, Califon, NJ (US); Andrew Stergiopoulos, New York, NY (US); William P Tselepis, New Providence, NJ (US)

(73) Assignee: BGC Partners, Inc., New York, NY (US)

( * ) Notice: Subject to any disclaimer, the term of this patent is extended or adjusted under 35 U.S.C. 154(b) by 1325 days.

(21) Appl. No.: 09/851,848

(22) Filed: May 9, 2001

(65) Prior Publication Data

US 2002/0169704 A1  Nov. 14, 2002

(51) Int. Cl.
*G06Q 40/00*  (2006.01)
(52) U.S. Cl. .......................................... 705/37
(58) Field of Classification Search ................. 705/26, 705/27, 35, 36 R, 37–40
See application file for complete search history.

(56) References Cited

U.S. PATENT DOCUMENTS

| | | | |
|---|---|---|---|
| 5,243,331 A * | 9/1993 | McCausland et al. ....... 345/172 |
| 5,258,908 A | 11/1993 | Hartheimer et al. ......... 364/408 |
| 5,727,165 A | 3/1998 | Ordish et al. ............... 395/237 |
| 6,230,147 B1 * | 5/2001 | Alaia et al. .................... 705/37 |
| 6,505,174 B1 * | 1/2003 | Keiser et al. .............. 705/36 R |
| 2001/0032175 A1 * | 10/2001 | Holden et al. ................. 705/37 |
| 2001/0037279 A1 | 11/2001 | Yeo ............................. 705/37 |
| 2002/0073014 A1 | 6/2002 | Gilbert ........................ 705/37 |

FOREIGN PATENT DOCUMENTS

| | | |
|---|---|---|
| JP | 358161068 | 9/1983 |
| WO | WO 00/11588 | 3/2000 |

\* cited by examiner

*Primary Examiner*—Hani M. Kazimi
*Assistant Examiner*—Olabode Akintola
(74) *Attorney, Agent, or Firm*—Antonio Papageorgiou

(57) ABSTRACT

Systems and methods are provided to control gaming in electronic trading markets. These systems and methods alleviate the problem of a seller or buyer trying to act on a trader's original bid or offer only to trade at an unfavorable level after the trader changes the bid or offer. A pricing method suspends trading for a period of time if a price difference between two bids or offers by the same trader is too great. A timing method prevents a trader from canceling or replacing a bid or offer for a period of time. These methods provide a more fair and efficient way of executing electronic trades.

13 Claims, 6 Drawing Sheets

SYSTEMS AND METHODS FOR CONTROLLING TRADERS FROM MANIPULATING ELECTRONIC TRADING MARKETS

BACKGROUND OF THE INVENTION

This invention relates to electronic trading markets. More particularly, this invention relates to ways to control the extent to which traders can manipulate electronic trading markets.

As electronic trading becomes more popular, there is an increasing need to control the extent to which traders can manipulate and abuse electronic trading markets. Currently, the trading of fixed-income securities, such as United States Treasuries, United Kingdom Gilts, European Government Bonds, and Emerging Market debts, and non-fixed income securities, such as stocks, is possible through electronic trading systems.

In one method of electronic trading, bids and offers are submitted by traders to a trading system. A bid indicates a desire to buy while an offer indicates a desire to sell. These bids and offers are then displayed by the trading system to other traders. The other traders may respond to these bids and offers by submitting sell (or hit) or buy (or lift or take) commands to the trading system. Once a bid or offer has been responded to by a sell or buy command, a trade has been executed.

Electronic trading can be conducted over any suitable communication system. For example, networked computers can be used to implement a trading system. Traders can submit bid, offer, hit, or lift commands via any suitable input device, such as a mouse, keyboard, or any other suitable device.

Electronic timers are sometimes used in electronic trading systems. In certain systems, a "trade-state" timer may be used to provide a period of exclusivity for two traders (called "current workers") who are "working-up" a trade—i.e., adding size to a pending series of trades. This trade-state timer may be set to a predetermined time period. For example, for U.S. Treasuries, the trade-state timer may be set to twelve seconds. During a work-up trade, the current workers may have a right of first refusal to trade at a certain level. A current worker may submit a bid or an offer anytime during this trade state. However, during this period, no other trader may submit a bid or offer, or respond with a sell or buy command.

In some systems, "bid-offer" timers may be used to prevent traders from prematurely canceling bids and offers entered by the traders. The timers may give other traders an opportunity to respond to the bids and offers before they can be cancelled by the traders that submitted them. The timers may be set to a predetermined period. For example, in U.S. Treasuries, the bid-offer timer may be preferably set to four seconds. The bid-offer timer may begin when a trader has submitted a bid or offer to the trading system.

When these timers are used together in an electronic trading system, a bid-offer timer may begin when a current worker submits a bid or offer during a work-up trade. The submission of the bid or offer may be timed so that the bid-offer timer expires just prior to the time that the trade-state timer expires. Immediately upon expiration of the trade-state timer, the former current worker may then replace the current bid or offer with a lower bid or offer. At the same time, another trader may submit a sell or buy command in response to the current worker's first bid or offer. Since the current worker has replaced the first bid or offer, the new trader may unintentionally end up selling or buying at a different level than was expected. By canceling the earlier bid or offer and submitting a new bid or offer in order to deceive the new trader, the current worker is said to be "gaming" the market.

Many current trading markets allow traders to "game" the market. As explained above, one form of gaming is done by submitting a bid or offer to the market only to quickly replace it with a new bid or offer. This can be accomplished by manipulating the market timers.

The bids or offers may be any trade type. These may include all-or-none (AON), limit order (LMT), market order (MKT), market-if-touched (MIT), stop-order (STP), etc. More common in gaming is submitting a market order as a first bid or offer and then canceling and replacing the market order with a limit order. A market order buys or sells at the current trading price while a limit order buys or sells at a stated price or better off the current market.

In view of the foregoing, it would be desirable to provide systems and methods for controlling a trader's ability to manipulate electronic trading markets.

SUMMARY OF THE INVENTION

It is an object of this invention to provide systems and methods for controlling a trader's ability to manipulate electronic trading markets.

For background purposes only, a trading interface for an electronic trading system that may be used in accordance with the present invention is illustrated in Kirwin et al. U.S. patent application Ser. No. 09/745,651, filed Dec. 22, 2000, which is hereby incorporated by reference herein in its entirety.

In accordance with this invention, a variety of approaches to control gaming during electronic trading may be used. One approach compares a price difference between two bids or offers. A second approach manipulates the bid-offer and trade-state timers.

More particularly, the price approach may compare the prices of the new and old bids or offers by a trader upon receiving a request to replace a bid or offer. If the change in price is greater than some predetermined value set by the trading system, the trading system may only permit the bid or offer to be replaced by first entering a "cooling off" period. During this cooling off period, any attempt to sell or buy in response to the bid or offer may be suspended. In this way, a new trader has an opportunity to see the price change before submitting a sell or buy command. As an alternative, if the change in price is too great, the new bid or offer may be automatically removed from the market.

The time approach links the timeout of the bid-offer timer to the end of the trade-state timer, rather than the time when a bid or offer was submitted. In this approach, the bid-offer timer may be programmed to count down upon completion of the trade-state timer if a current worker submitted a bid or offer during the trade state. During this time, a new trader (seller or buyer) may respond to the bid or offer, and the current worker cannot cancel or replace the bid or offer during the trade-state timer or during the bid-offer timer.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides systems and methods for controlling gaming in electronic trading systems. One approach involves detecting a change in price between two bids or offers by the same trader and suspending trading for a predetermined amount of time if the price difference is too large, or removing the new bid or offer from the trading system. Another approach involves preventing a trader from canceling or replacing a bid or offer for a predetermined amount of time by linking the timers associated with entry and modifications of bid, offer, sell, and buy commands.

Figure 1:
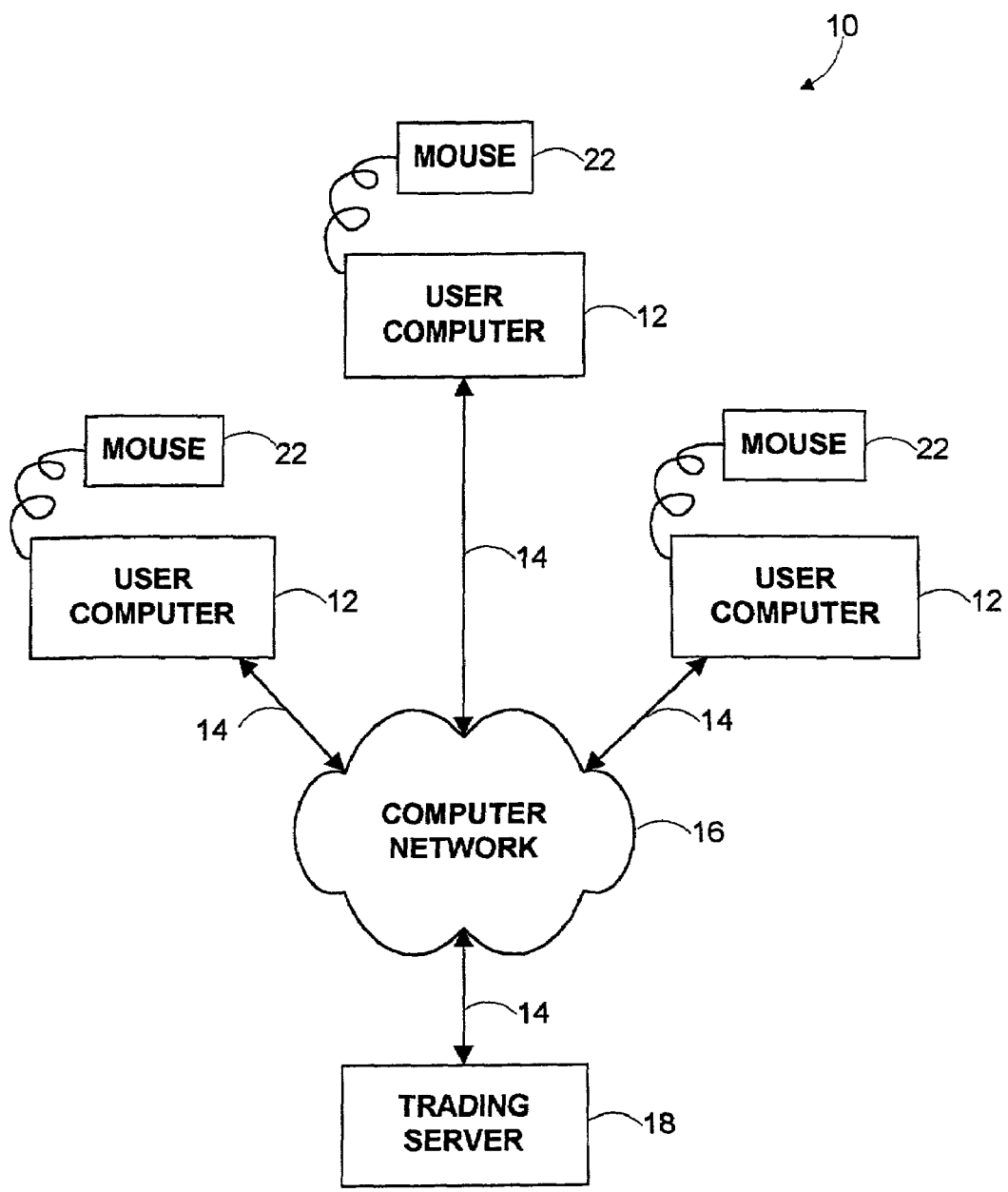
FIG. 1 is a hardware implementation of an exemplary embodiment of an electronic trading system in accordance with the present invention.

FIG. 1 illustrates one embodiment of an electronic trading system 10 according to the present invention. As shown, system 10 may include one or more user computers 12, each of which may include a mouse 22, that are connected by one or more communication links 14 and a computer network 16 to a trading server 18.

In system 10, trading server 18 may be a processor, a computer, a data processing device, or any other suitable server. User computer 12 may be a computer, processor, personal computer, computer terminal, personal digital assistant, a combination of such devices, or any other suitable data processing device. Mouse 22 may be any suitable pointing device capable of receiving user input. Computer network 16 may be any suitable network, including the Internet, an intranet, a wide area network (WAN), a local area network (LAN), a wireless network, a digital subscriber line (DSL) network, a frame relay network, an asynchronous transfer mode network (ATM), a virtual private network (VPN), etc. Communication links 14 may be any suitable communication links for communicating data between user computers 12 and trading server 18, such as network links, dial-up links, wireless links, hard-wired links, etc.

All trading interactions between user computers 12 preferably occur via computer network 16, trading server 18, and communication links 14. Traders at user computers 12 may conduct trading transactions using mice 22, keyboards, or any other suitable devices.

Figure 2:
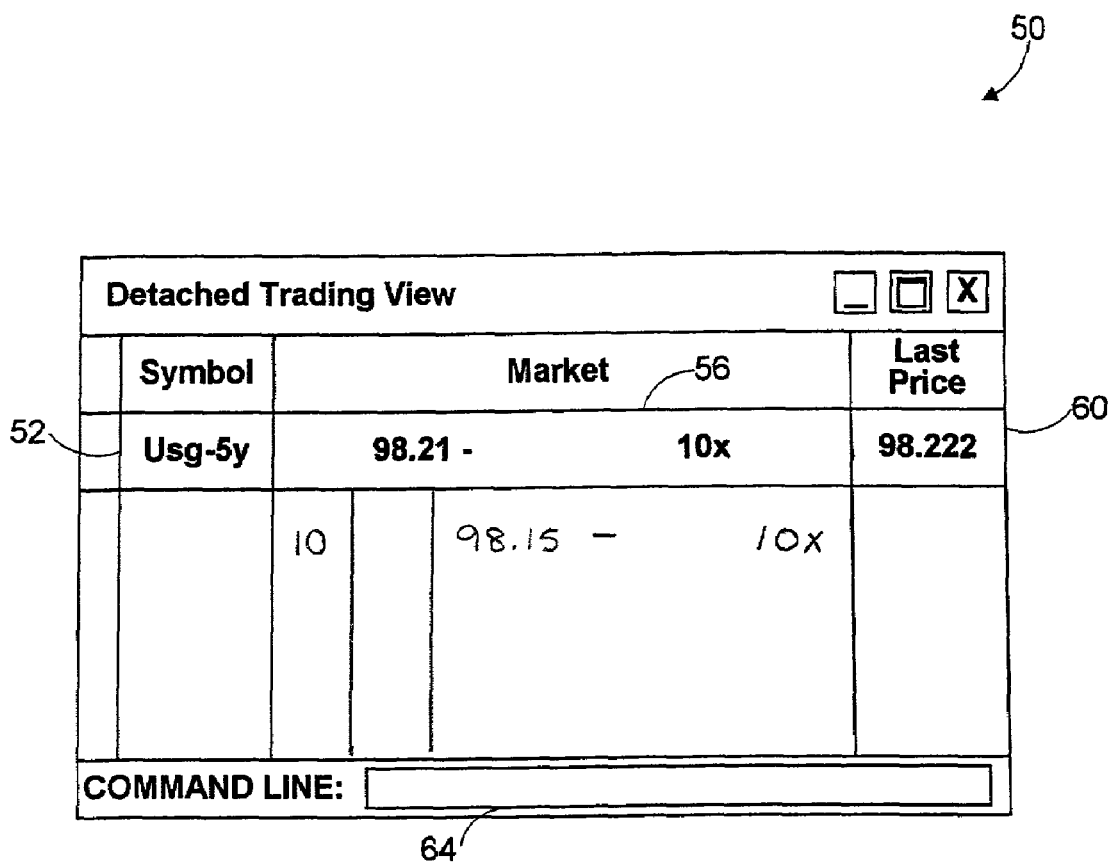
FIG. 2 illustrates a detached trading view of a market cell containing a bid in accordance with the present invention.
Figure 3:
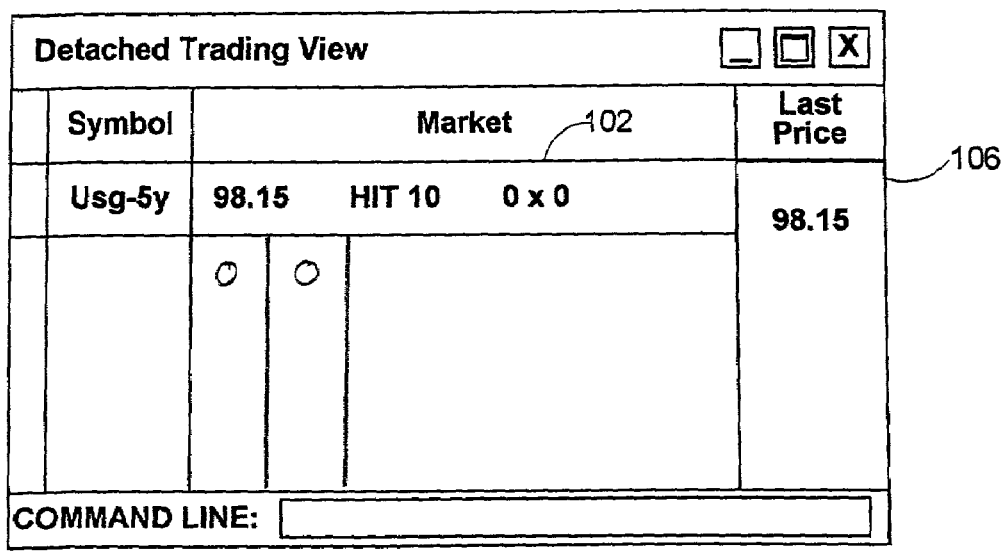
FIG. 3 illustrates a detached trading view of a market cell when a trader has gamed the market in trading systems prior to the present invention.
Figure 4:
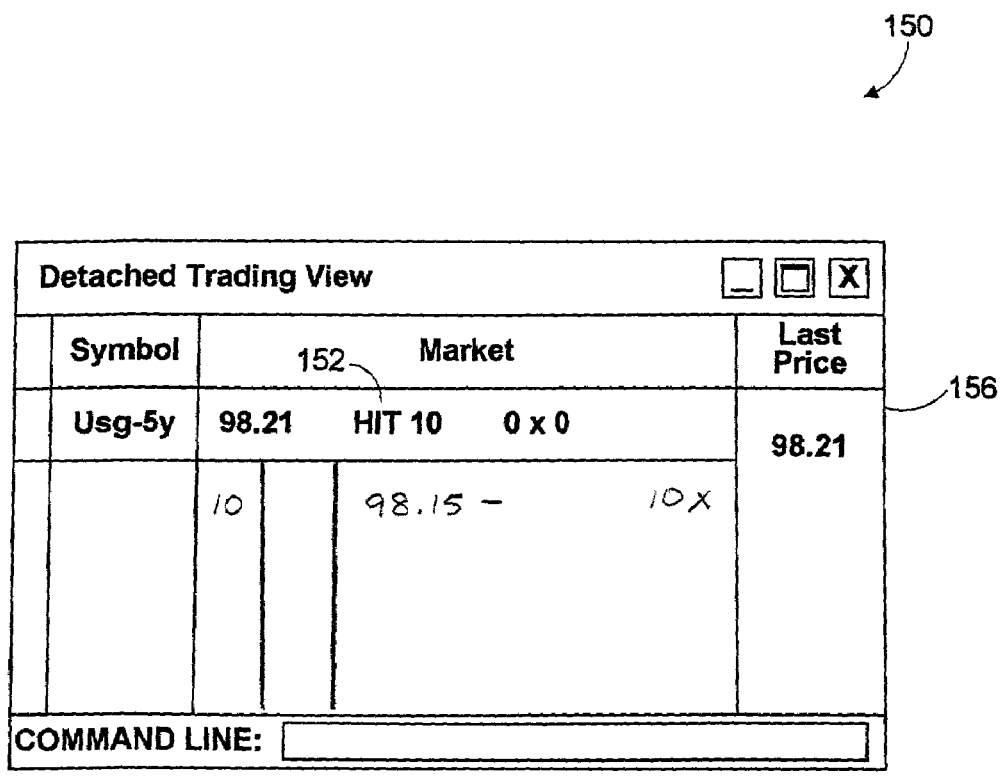
FIG. 4 illustrates a detached trading view of a market cell when a seller responds to a bid in accordance with the present invention.

FIGS. 2-4 illustrate market cells that may be displayed on a user computer 12 in accordance with the present invention. A market cell may include indications of the item to be traded, pending bids and/or offers for the item, the last trading price, and a field for entering trade commands. For ease of description, FIGS. 2-4 will be described in terms of bids although the same applies for offers as well.

FIG. 2 illustrates a detached trading view of a market cell 50 containing a market order bid entered by a trader for an item. As shown, a symbol 52 for the item to be traded (e.g., usg-5y) may be indicated. As also shown, the trader may have entered a market order bid 56 having a price of 98.21 for $10 million in 5 year bonds as well as a limit order bid 58 having a price of 98.14 for the same amount. The last trading price 60 for the item (e.g., 98.222) may also be indicated. "Command Line" 64 may be used by a trader to enter a bid, offer, sell, buy, cancel, or replace command, or any other suitable command. These commands may be entered using text, using dedicated buttons, or using any other suitable approach to execute trade commands.

FIG. 3 illustrates a detaching trading view of market cell 100 after a trader has gamed the market. Using the existing electronic trading system, a trader can manipulate the timers to replace market order bid 56 in FIG. 2 with the limit order bid 102 (bid 58 in FIG. 2) having a price of 98.15. Unaware of this change, a seller thinks he or she is responding to the 98.21 bid when he or she is actually responding to the 98.15 bid. The new price is indicated in last price column 106.

FIG. 4 illustrates a detached trading view of a market cell 150 when a trader tries to cancel or replace bid 56 prior to a seller responding to the bid. Under the present invention, a trader who tries to cancel or replace a bid will either be prevented from changing the bid for a predetermined time period or trading for the item will be suspended, giving a potential seller notice of the new bid.

If a bid cannot be canceled for a predetermined time period, a seller may hit the bid as indicated by indicator 152. As shown, the seller has sold $10 million of usg-5Y at a price of 98.21. The new trading price is reflected in the last price column 156.

Figure 5:
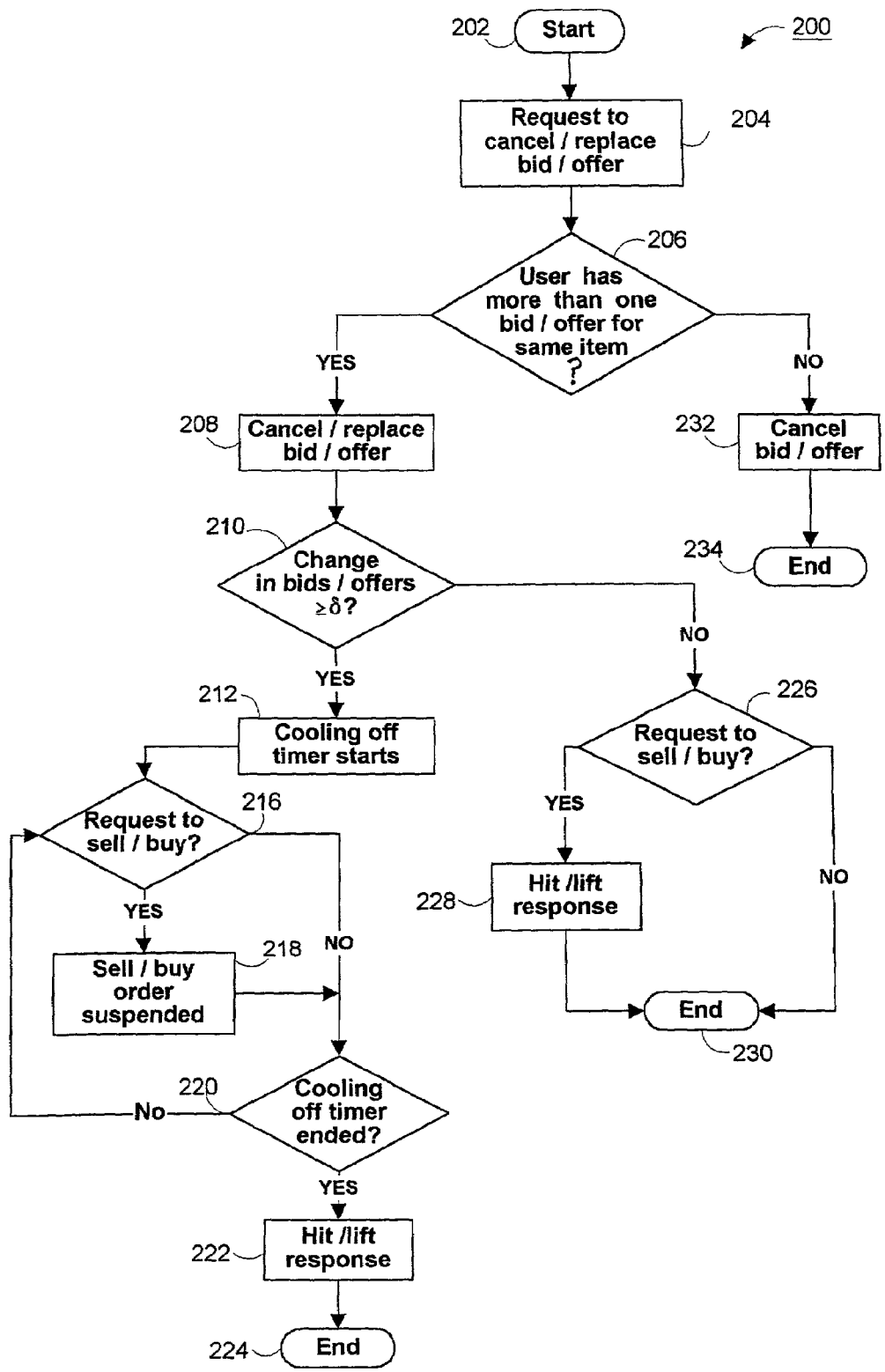
FIG. 5 is a flow diagram of an exemplary embodiment of a price approach in accordance with the present invention.

FIG. 5 is a flow diagram of a price approach to prevent gaming in accordance with the present invention. Process 200 begins at step 202 with one or more bids or offers already entered in the trading system. A bid or offer can be a market order, a limit order, any other type of order, or any combination of orders. At step 204, the trading system may receive a request to cancel or replace a bid or offer. Next, at step 206, the trading system may determine whether the trader has more than one order for the same item.

If the trader has more than one order, the trading system takes steps to prevent possible gaming. At step 208, the trading system cancels the first bid or offer and replaces it with the second bid or offer. Next, at step 210, the trading system compares the price of the canceled bid or offer with the new bid or offer. If the price change in the bids or offers is greater than some delta (e.g., ⅟32nd, or any other suitable price difference), process 200 moves to step 212 where a cooling off period timer starts. During this cooling off period, if the trading system receives a request to sell or buy at step 216, the sell or buy order is suspended at step 218 to give the seller or buyer notice of a change in bid or offer price.

After suspending the sell or buy order, or if the trading system has not received a request to sell or buy, process 200 checks whether the cooling period has ended at step 220 and if not, process 200 moves back to step 216. The cooling off period may last any suitable amount of time (e.g., 2 seconds). If the cooling period has ended at step 220, the new bid or offer is updated on the trading system and a seller or buyer can respond with a hit or lift at step 222. Once a hit or lift is received, a trade occurs and process 200 ends at step 224.

If the price change in bids or offers at step 210 is not greater than the predetermined delta, process 200 moves to step 226 where the trading system checks for a request to sell or buy. If there is a request to sell or buy (i.e., a seller or buyer responds with a hit or lift response) at step 228, then a trade occurs and process 200 ends at step 230. Process 200 may also end at step 230 immediately after step 226 if there is no request to sell or buy.

If the trading system determines that a user does not have more than one bid or offer for the same item at step 206, process 200 cancels the bid or offer at step 232. Since the trader no longer has a bid or offer in the market, process 200 ends at step 234.

Figure 6:
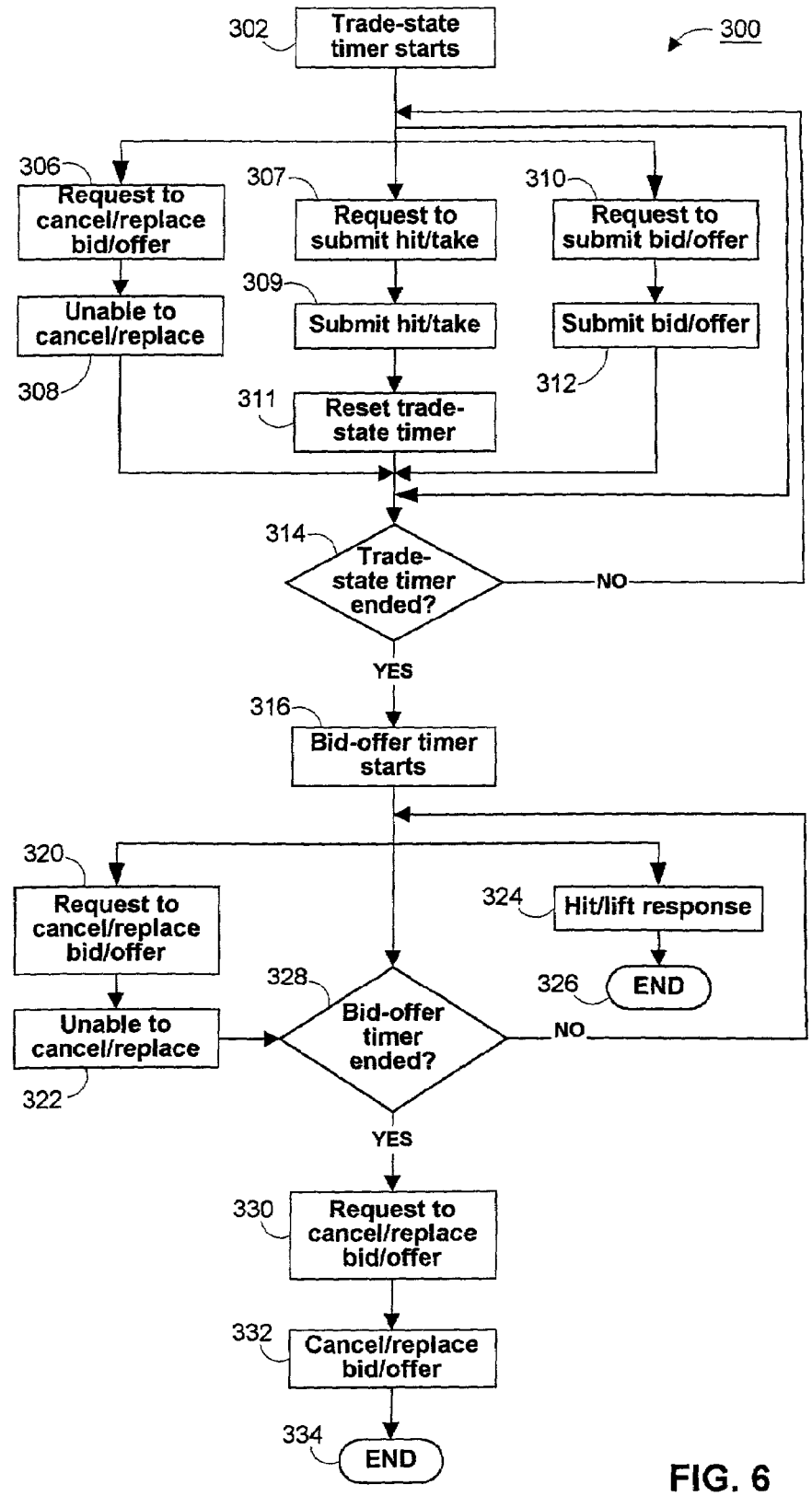
FIG. 6 is a flow diagram of an exemplary embodiment of a timing approach in accordance with the present invention.

FIG. 6 is a flow diagram of a timing approach to control gaming according to the present invention. Process 300 begins at step 302 by starting a trade-state timer. At this point, the trading system for a particular item has entered a trade state. During this trade state several events may occur. One event may be a request to cancel or replace a current bid or offer at step 306. If this occurs, the trader will be prevented from canceling or replacing the bid or offer, and a pop-up window may be displayed on the trader's screen indicating that he or she cannot cancel or replace the bid or offer until the trade state is over at step 308. A second event may be a request to submit a hit or take at step 307. If this occurs, a second trader will be able to submit a hit or take in response to the bid or offer at step 309. Then at step 311, the trading system will reset the trade-state timer. A third event may be a request to submit a bid or offer at step 310. If this occurs, a trader will be able to submit a bid or offer at step 312. If the trader currently has a bid or offer in the market, submitting a new bid or offer will not replace or cancel the existing bid or offer.

After step 308, 311, or 312, or directly after step 302 (if none of the requests indicated in steps 306, 307, and 310 are made), process 300 moves to step 314 where the trading system determines whether the trade-state timer has ended. If the trade-state timer has not ended, process 300 remains in the trade state to wait for a request to cancel or replace an order at step 306, a request to submit a hit or take at step 307, a request to submit a bid or offer at step 311, or for the timer to end at step 314. If the trade-state timer has ended, process 300 moves to step 316 where the bid-offer timer starts. At this point, process 300 is in a bid-offer state. During the bid-offer state (e.g., 4 seconds or any other suitable time period), one of several things can occur. If process 300 receives a hit or lift response from a seller or buyer, a trade will occur at the bid or offer price made during the trade state at step 324. Process 300 will then end at step 326.

During the bid-offer state, process 300 can receive a request to cancel or replace an order at step 320. If this occurs, similar to the trade state, the trader will be prevented from canceling or replacing the order, and a pop-up window, or any other suitable method, may be used to communicate this message to the trader at step 322.

After step 322, or directly after step 316, process 300 may determine whether the bid-offer timer has ended at step 328. If the timer has not ended, process 300 may remain in the bid-offer state to wait for a request to cancel or replace a bid or offer at step 320, for a hit or lift response at step 324, or for the timer to end at step 328. If the bid-offer timer has ended, process 300 may then receive a request to cancel or replace an order at step 330. If such a request is received, the bid or offer will be canceled and will be replaced by a new bid or offer at step 332. Process 300 may then end at step 334.

Gaming may be controlled to prevent as well as to promote gaming. Gaming may be promoted by creating liquidity in an illiquid market (e.g., by controlling and encouraging gaming to whatever degree the market will permit). An example for increasing liquidity may be to take an illiquid security, such as an old bond (e.g., 30 year United States Treasury bond), and permit gaming so that trades increase. The permitted sale may be based on a sliding scale of various elements that are controlled. The permitted sale may also occur by permitting the trade to increase until a specific volume is attained, or by generally permitting gaming for specific securities (such as the old bond) in illiquid markets.

Thus it is seen that systems and methods are provided to control gaming in electronic trading systems. One skilled in the art will appreciate that the present invention can be practiced by other than the described embodiments, which are presented for purposes of illustration and not of limitation, and the present invention is limited only by the claims which follow.

What is claimed is:

1. A method comprising:
   receiving a first order for an item from a first trader;
   receiving a second order for the item from the first trader;
   receiving a request to cancel the first order for the item;
   starting a cooling off period based on receipt of the request to cancel the first order and based on a difference between a price of the first order and a price of the second order being greater than a predetermined amount;
   receiving from a second trader, during the cooling off period, an order to buy or sell the item, the order from the second trader counter side to the first order and the second order from the first trader; and
   suspending the order to buy or sell the item from the second trader, as a result of the buy or sell order being received during the cooling off period, and for a period of time for the second trader to notice a change in the first order and the second order prices.

2. The method of claim 1 comprising canceling the first order, the second order thereby replacing the first order.

3. The method of claim 2 comprising executing the order to buy or sell the item against the second order after the cooling off period.

4. The method of claim 1 comprising executing the order to buy or sell the item against the second order without suspending the order to buy or sell the item when the price difference between the first order and the second order is less than the predetermined amount.

5. The method of claim 1, wherein at least one of the first and the second orders are submitted during a period wherein at least one of the first trader and the second trader has exclusivity.

6. The method of claim 1, wherein at least one of the first and the second orders are submitted during a period wherein the first trader cannot cancel bids or offers.

7. The method of claim 3, comprising communicating the price of the second order to the second trader, and receiving a hit or lift from the second trader after the cooling off period.

8. A trading system comprising at least one computing device operable to:
   receive a first order for an item from a first trader;
   receive a second order for the item from the first trader;
   receive a request to cancel the first order for the item;
   start a cooling off period based on receipt of the request to cancel the first order and when a difference between a price of the first order and a price of the second order is greater than a predetermined amount;
   receive from a second trader, during the cooling off period, an order to buy or sell the item, the order from the second trader counter side to at least one of the first order and the second order from the first trader; and
   suspend the order to buy or sell the item from the second trader, as a result of the buy or sell order being received during the cooling off period, and for a period of time for the second trader to notice a change in the first order and the second order prices.

9. The system of claim 8, the at least one computing device operable to cancel the first order, the second order thereby replacing the first order.

10. The system of claim 9, the at least one computing device operable to execute the order to buy or sell the item against the second order after the cooling off period.

11. The system of claim 10, the at least one computing device operable to communicate the price of the second order to the second trader, and receive a hit or lift from the second trader after the cooling off period.

12. The system of claim 8, the at least one computing device operable to execute the order to buy or sell the item against the second order without suspending the order to buy or sell the item when the price difference between the first order and the second order is less than the predetermined amount.

13. A method comprising:

receiving a first order to trade an item;

receiving a second order to trade the item, the first and second orders each submitted by a first trader and each specifying a price;

receiving a request to cancel or replace the first order;

determining a difference between the price of the first order and the price of the second order;

starting a cooling off period based on receipt of the request to cancel or replace the first order and when the difference between the price of the first order and the price of the second order is greater than a predetermined amount;

receiving from a second trader, during the cooling off period, an order to buy or sell the item, the order from the second trader counter side to at least one of the first order and the second order from the first trader;

suspending the order to buy or sell the item from the second trader, as a result of the buy or sell order being received during the cooling off period, and for a period of time for the second trader to notice a change in the first order and the second order prices;

receiving a command accepting the second order from the second trader; and executing the order to buy or sell the item against the second order in response to the acceptance command.

* * * * *